United States Patent
Sarkar et al.

(10) Patent No.: US 12,327,410 B2
(45) Date of Patent: Jun. 10, 2025

(54) METHODS AND SYSTEMS FOR DISAMBIGUATION OF REFERRED OBJECTS FOR EMBODIED AGENTS

(71) Applicant: Tata Consultancy Services Limited, Mumbai (IN)

(72) Inventors: Chayan Sarkar, Kolkata (IN); Pradip Pramanick, Kolkata (IN); Brojeshwar Bhowmick, Kolkata (IN); Ruddra Dev Roychoudhury, Kolkata (IN); Sayan Paul, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 257 days.

(21) Appl. No.: 18/207,836

(22) Filed: Jun. 9, 2023

(65) Prior Publication Data
US 2024/0013538 A1    Jan. 11, 2024

(30) Foreign Application Priority Data
Jul. 7, 2022 (IN) .............................. 202221039195

(51) Int. Cl.
*G06V 20/50* (2022.01)
*G06F 40/205* (2020.01)
(Continued)

(52) U.S. Cl.
CPC ............ *G06V 20/50* (2022.01); *G06F 40/205* (2020.01); *G06F 40/284* (2020.01); *G06F 40/40* (2020.01); *G06T 15/00* (2013.01); *G06V 10/764* (2022.01)

(58) Field of Classification Search
CPC ...... G06V 20/50; G06V 10/764; G06V 10/82; G06V 20/70; G06F 40/205; G06F 40/284;
(Continued)

(56) References Cited

U.S. PATENT DOCUMENTS

| | | | | |
|---|---|---|---|---|
| 12,030,196 B2 * | 7/2024 | Gildert | ................... | G06F 40/40 |
| 12,172,327 B2 * | 12/2024 | Gildert | ................... | B25J 9/1661 |

(Continued)

OTHER PUBLICATIONS

Brandão et al., "Multiple Hypothesis for Object Class Disambiguation from Multiple Observations," (2014).
(Continued)

*Primary Examiner* — Vijay Shankar
(74) *Attorney, Agent, or Firm* — Finnegan, Henderson, Farabow, Garrett & Dunner, LLP

(57) ABSTRACT

This disclosure addresses the unresolved problems of tackling object disambiguation task for an embodied agent. The embodiments of present disclosure provide a method and system for disambiguation of referred objects for embodied agents. With a phrase-to-graph network disclosed in the system of the present disclosure, any natural language object description indicating the object disambiguation task can be converted into a semantic graph representation. This not only provides a formal representation of the referred object and object instances but also helps to find an ambiguity in disambiguating the referred object using a real-time multi-view aggregation algorithm. The real-time multi-view aggregation algorithm processes multiple observations from an environment and finds the unique instances of the referred object. The method of the present disclosure demonstrates significant improvement in qualifying ambiguity detection with accurate, context-specific information so that it is sufficient for a user to come up with a reply towards disambiguation.

15 Claims, 5 Drawing Sheets

(51) Int. Cl.
*G06F 40/284* (2020.01)
*G06F 40/40* (2020.01)
*G06T 15/00* (2011.01)
*G06V 10/764* (2022.01)

(58) Field of Classification Search
CPC ..... G06F 40/40; G06F 16/3329; G06T 15/00; G06T 17/00; G06T 17/005; G06T 17/05
See application file for complete search history.

(56) References Cited

U.S. PATENT DOCUMENTS

2024/0288870 A1* 8/2024 Hori .................. G06V 40/20
2025/0018562 A1* 1/2025 Xia .................. B25J 9/1653

OTHER PUBLICATIONS

Hatori et al., "Interactively Picking Real-World Objects with Unconstrained Spoken Language Instructions," (2017).
Shridhar et al., "Ingress: Interactive visual grounding of referring expressions," (2020).
Yi et al., "Incremental Object Grounding Using Scene Graphs," (2022).

* cited by examiner

METHODS AND SYSTEMS FOR DISAMBIGUATION OF REFERRED OBJECTS FOR EMBODIED AGENTS

PRIORITY CLAIM

This U.S. patent application claims priority under 35 U.S.C. § 119 to: India Application No. 202221039195, filed on Jul. 7, 2022. The entire contents of the aforementioned application are incorporated herein by reference.

TECHNICAL FIELD

The disclosure herein generally relates to the field of object disambiguation, and, more particularly, to methods and systems for disambiguation of referred objects for embodied agents.

BACKGROUND

With surge of robots being used as assistants or companions rather than just a high-precision tool, expectations from the robots to act autonomously (to some extent if not fully) is increasing so that any novice user can also use them. Natural human-robot interaction plays an important role in functioning of robot in autonomous manner by increasing usability and acceptability of the robot. This involves specifying robotic task instruction in natural language. Most task instructions involve a referred object that the robot must locate within an environment to continue the task. While task intent understanding is an essential part of natural language understanding, less effort is made in resolving the ambiguity that can arise while grounding the task. While a few conventional methods use vision-based task grounding and ambiguity detection, but there is always a fixed view for a static robot to ground the object in the conventional methods. For mobile robots, where the ideal view is not known beforehand, the problem of ambiguity detection during task grounding is magnified. Moreover, a single view may not be sufficient to locate all the object instances in a given area, which leads to inaccurate ambiguity detection.

SUMMARY

Embodiments of the present disclosure present technological improvements as solutions to one or more of the above-mentioned technical problems recognized by the inventors in conventional systems. For example, in one embodiment, a processor implemented method is provided. The method comprising receiving, via one or more hardware processors, (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object; detecting, via the one or more hardware processors, a plurality of objects in each of the set of successive images corresponding to the one or more views of the current scene using an object detector; generating, via the one or more hardware processors, a natural language text description for each of the plurality of detected objects in each of the set of successive images using a dense-image captioning model; determining, via the one or more hardware processors, a graph representation of (i) the at least one natural language instruction, and (ii) the natural language text description for each of the plurality of detected objects in each of the set of successive images using a phrase-to-graph network; identifying, via the one or more hardware processors, a set of unique instance graph representations for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images; determining, via the one or more hardware processors, an ambiguity in identifying the target object using a graph discriminator algorithm, wherein the graph discriminator algorithm utilizes the set of unique instance graph representations for determining the ambiguity; and generating, via the one or more hardware processors, a descriptive query using the graph discriminator algorithm to extract information, wherein the extracted information is used for disambiguating the target object.

In another aspect, a system is provided. The system comprising a memory storing instructions; one or more communication interfaces; and one or more hardware processors coupled to the memory via the one or more communication interfaces, wherein the one or more hardware processors are configured by the instructions to receive, (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object; detect, a plurality of objects in each of the set of successive images corresponding to the one or more views of the current scene using an object detector; generate, a natural language text description for each of the plurality of detected objects in each of the set of successive images using a dense-image captioning model; determine, a graph representation of (i) the at least one natural language instruction, and (ii) the natural language text description for each of the plurality of detected objects in each of the set of successive images using a phrase-to-graph network; identify, a set of unique instance graph representations for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images; determine, an ambiguity in identifying the target object using a graph discriminator algorithm, wherein the graph discriminator algorithm utilizes the set of unique instance graph representations for determining the ambiguity; and generate, a descriptive query using the graph discriminator algorithm to extract information, wherein the extracted information is used for disambiguating the target object.

In yet another aspect, a non-transitory computer readable medium is provided. The non-transitory computer readable medium comprising receiving, via one or more hardware processors, (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object; detecting, via the one or more hardware processors, a plurality of objects in each of the set of successive images corresponding to the one or more views of the current scene using an object detector; generating, via the one or more hardware processors, a natural language text description for each of the plurality of detected objects in each of the set of successive images using a dense-image captioning model; determining, via the one or more hardware processors, a graph representation of (i) the at least one natural language instruction, and (ii) the natural language text description for each of the plurality of detected objects in each of the set of successive images using a phrase-to-graph network; identifying, via the one or more hardware processors, a set of unique instance graph representations for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images; determining, via the one or more hardware processors, an ambiguity in identifying the target object using a graph discriminator algorithm, wherein the graph discriminator algorithm utilizes the set of unique instance graph representations for determining the ambiguity; and generating, via the one or more hardware processors, a descriptive query using the graph discriminator algorithm to extract information, wherein the extracted information is used for disambiguating the target object.

In accordance with an embodiment of the present disclosure, the phrase-to-graph network comprises: a transformer-based pre-trained BERT model to provide a contextual hidden representation $h_i$ for each input token $t_i$ comprised in (i) at least one natural language instruction, and (ii) the natural language text description for each of the plurality of detected objects in each of the set of successive images; a feed-forward network with softmax layer to predict a sequence of labels for each input token $t_i$ from a set of graph related symbols by determining a probability distribution of the contextual hidden representation $h_i$ for each input token $t_i$ over the set of graph related symbols; and a tag to graph grammar module to construct the graph representation of (i) at least one natural language instruction and (ii) the natural language text description for each of the plurality of detected objects in each of the set of successive images using a deterministic top-down parsing algorithm from the predicted sequence of labels.

In accordance with an embodiment of the present disclosure, the graph representation of (i) at least one natural language instruction, and (ii) the natural language text description for each of the plurality of detected objects in each of the set of successive images comprises a root node representative of the target object and a plurality of edges representative of one or more self attributes and one or more relational attributes of the target object.

In accordance with an embodiment of the present disclosure, the multi-view aggregation algorithm comprising the steps of: obtaining a three-dimensional (3D) point cloud of each detected object from the plurality of detected objects in each of the set of successive images; generating, a dense occupancy two-dimensional (2D) grid map for each detected object from the plurality of detected objects in each of the set of successive images, wherein the dense occupancy 2D grid map is generated by discretizing the 3D point cloud of each detected object into a voxel grid and determining a top-down bird's eye view (BEV) projection of the voxel grid; aggregating, the dense occupancy 2D grid maps for a set of objects from the plurality of detected objects in each of the set of successive images which have same object graph representation to obtain a single dense occupancy 2D grid map corresponding to each of a set of unique object graph representations; determining an occupancy score for each of a plurality of regions defined on each dense occupancy grid map corresponding to each of the set of unique object graph representations, by summing a plurality of grid cell weights within each of the plurality of regions, wherein each of the grid cell weights are indicative of average weight of points in the grid cell; determining a normalized occupancy score distribution over each of the dense occupancy grid maps corresponding to each of the set of unique object graph representations by analyzing intensity of the plurality of grid cells on the grid map, wherein the normalized occupancy score distribution is used to find local maxima that approximately localizes one or more instances of each of the set of unique object graph representations; and determining a unique instance graph representation for the target object by stacking each of the dense occupancy grid maps corresponding to each of the set of unique object graph representations on top of the other, and then max-pooling along the stacked dimension.

In accordance with an embodiment of the present disclosure, the graph discriminator algorithm comprising: determining, a set of discriminative instance graph representations by computing a pairwise set difference between the graph representation of at least one natural language instruction and each of the set of unique instance graph representations of the plurality of detected objects; classifying, information comprised in the one or more natural language instructions for identifying the target object into one of (i) a confirm state based on a comparison of cardinality of the set of discriminative instance graph representations with a first predefined value, (ii) a mismatch state, (iii) an ambiguous state based on a comparison of cardinality of the set of discriminative instance graph representations with a second predefined value, and (iv) a missing state based on a comparison of cardinality of the set of unique instance graph representations with the first predefined value; and determining the ambiguity in identifying the target object based on the classified state.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
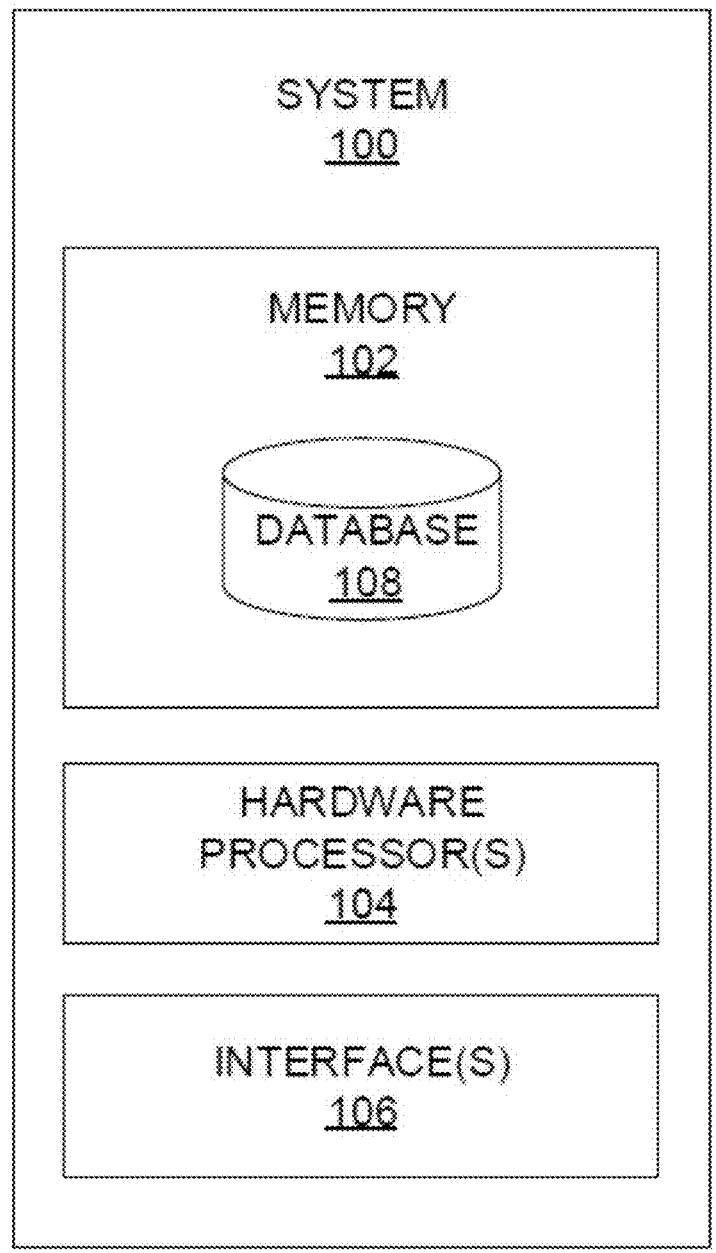
FIG. 1 illustrates an exemplary system for disambiguation of referred objects for embodied agents according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

With surge of robots being used as assistants or companions rather than just a high-precision tools, expectations from the robots to act autonomously (to some extent if not fully) is increasing so that any novice user can also use them. Natural human-robot interaction plays an important role in functioning of robot in autonomous manner by increasing usability and acceptability of the robot. This involves specifying robotic task instruction in natural language. One of the fundamental tasks for the robot is to identify and locate objects (ILO) within the environment in which it is residing. There are many applications that require ILO as a capability such as visual question answering, visual semantic navigation, interactive object picking, and/or the like. Thus, natural language understanding and grounding is a key feature of any robot. The goal of natural language understanding (NLU) in robotics applications is primarily aimed towards understanding the task intention, regardless of how such intentions are expressed. Additionally, this requires grounding the task in the environment the robot is operating. For example, a scenario is considered where a fellow human being is asked to help with some tasks such as "can you bring me the red cup from the dining table" or "please place the flower in the vase near the couch". Both of the above tasks involve identifying an object to complete the task. In the first case, it is the red cup on the dining table, and in the latter, it is the vase placed beside the couch. Target object identification (alternatively referred as target object grounding) involves looking around which humans do implicitly. In practice, a robot may face difficulty in grounding the referred object during execution. To tackle this, a visual understanding of the environment against the linguistic input is followed. Although several existing approaches have specifically focused on the visual grounding of natural object descriptions, but they do not tackle ambiguity.

In other words, while searching for the red cup, one may find only a black cup on the dining table or a red cup at the nearby counter, or none at all. In other words, there is no unique object that matches task description. In such a case, a suitable question should be asked to clarify the scenario and next course of action. A few of the conventional approaches of end-to-end training for visual grounding pose challenge to integrate a dialogue system, which generally require fine-grained scene analysis. Although visual question-answering systems can perform fine-grained scene analysis, they are limited to answering questions, as opposed to generating a specific query describing the cause of the ambiguity. Further, conventional task understanding approaches assume availability of a knowledge base (KB) of the environment that is sufficient to ground the task, hence are limited to only intention understanding. Even though the KB can be utilized for location reference, it would not be sufficient if there are multiple instances of the object available in same region. The referred object instance(s) can be identified using an object detection algorithm, but the ambiguity arising from multiple matching or mismatching instances cannot be resolved.

Some conventional approaches performing ambiguity resolution for picking task detect ambiguity in object grounding and raise query if detected. However, these methods are limited to a table-top setup, where an embodied agent assess a scene from a single view. In case of mobile agents, it is almost impractical to predetermine best view (i.e., scene) to ground an intended object and determine if there is any ambiguity. As a result, aggregation of multiple views is essential in order to determine the ambiguity correctly. Thus, multiple scenes of the environment must be processed to find the object instance(s) and determine if there is any ambiguity. In case of ambiguity, a query that conveys the ground situation in a meaningful way could be generated to help resolve the ambiguity. There exists several approaches that perform 3D visual grounding of natural language descriptions directly on aggregated scene point-cloud, but they fail to deal with ambiguous scenarios. The existing approaches use very detailed and specific descriptions to localize objects and have no dialogue system to assist the robot when it fails to ground an object. Moreover, the existing approaches sample-inefficient since they train their system in an end-to-end fashion which requires large, annotated 3D datasets.

Embodiments of the present disclosure provide methods and systems for disambiguation of objects for embodied agents which provides a new task for the embodied agent that aims to identify ambiguity in grounding a target object (alternatively referred as referred object) through exploration and raise a descriptive query that can help to disambiguate the target object. The system of the present disclosure is applicable where a human being may or may not share same physical environment, but is aware of the environment and its constitutes in general. Moreover, the human may or may not have visual feedback of what the embodied agent is currently viewing. Thus, any instruction to the embodied agent is presumptive. In order to identify the referred object that matches the description provided in a natural language task instruction, the method of present disclosure includes creating an input graph from the instruction and aggregates multiple scenes of the environment to find unique instance graph(s) of the referred object. The root node of a graph is represented by the referred object and the edges point to self attributes (e.g., color, material, and or the like) and relational attributes of the object with other objects in its vicinity. Finally, a graph discrimination algorithm is used to find ambiguity and generate query if there is ambiguity. In an embodiment, the conventional systems are not real-time and consume a lot of memory and computing resources to do panoptic segmentation on entire scene point clouds followed by different post-processing methods like clustering, fusion and/or the like. This hinders their direct usage in instance graph generation module. In contrast to the conventional systems, a 2-stage process is followed in the system of the present disclosure where any 2D object detector can be plugged into a spatio-temporal object tracking module, which aggregates only relevant data from multiple views and then generates instance graphs for the ambiguity resolution module. This enables the system of the present disclosure to be lightweight, real-time, and also helps in generalization to diverse scenarios.

More Specifically, the present disclosure describes the following:
1. The object disambiguation problem formulated for an embodied agent that requires natural language understanding, visual scene understanding, ambiguity detection, and query generation. The method of the present disclosure detects ambiguity in object grounding from multiple views of the environment and generates a context-specific query for disambiguation.
2. A system well-orchestrated using deep learning-based and deterministic algorithms-based sub-systems. A graph representation of objects from any natural language phrase is generated in the system of the present disclosure by training a BERT-based phrase-to-graph network. Further, a multi-view aggregation algorithm is developed to merge instance graphs representations across multiple frames to find unique object instances. Furthermore, a graph discrimination based deterministic algorithm is discussed that generates accurate queries on ambiguity.
3. Empirically, experiments using AI2Thor simulator which is an interactive embodied AI platform are conducted and disclosed to show efficacy of the system of the present disclosure. It is disclosed that the system of the present disclosure achieves 2 times more accuracy in describing the ambiguous scenario in comparison to a baseline system.

In other words, the present disclosure provides a system that can help an embodied agent to disambiguate the referred object by raising a suitable query whenever required. Given an area where the referred object is, the system of the present discourse finds instances of the object by aggregating multiple scenes while scanning the area. It then matches the description of these objects with the given instruction. If the system of the present disclosure narrows down only one instance, there is no ambiguity. However, in case of ambiguity, the system of the present disclosure raises a suitable query with information from ground. Further, experiments conducted with the AI2Thor simulator show that the system of the present disclosure not only detects the ambiguity more accurately, but it raises verbose queries with more accurate information from the ground.

Referring now to the drawings, and more particularly to FIGS. 1 through 9B, where similar reference characters denote corresponding features consistently throughout the figures, there are shown preferred embodiments and these embodiments are described in the context of the following exemplary system and/or method.

FIG. 1 illustrates an exemplary system 100 for disambiguation of referred objects for embodied agents according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises natural language instructions received from one or more users, a set of successive images from one or more views and a set of absolute poses of an embodied agent corresponding to the one or more views of a current scene in an environment. The database 108 further stores information on the scene in the environment.

The database 108 further stores information on multi-view aggregation such as three-dimensional point clouds, dense occupancy two-dimensional grid maps, and occupancy score, information on graph discrimination, and ambiguity identification such as one or more such as a set of question templates, generated descriptive queries. Information stored in the database 108 further comprises one or more graphical representations such as graphical representation of natural language instructions and natural language text description of detected objects also known as object graphs, a set of discriminative instance graph representations, and a set of unique instance graph representations.

The database 108 further comprises one or more networks such as phrase to graph networks, one or more neural network(s), feed forward network, one or more models such as transformer-based pre-trained BERT model and language models, one or more modules such as tap to grammar module which when invoked and executed perform corresponding steps/actions as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
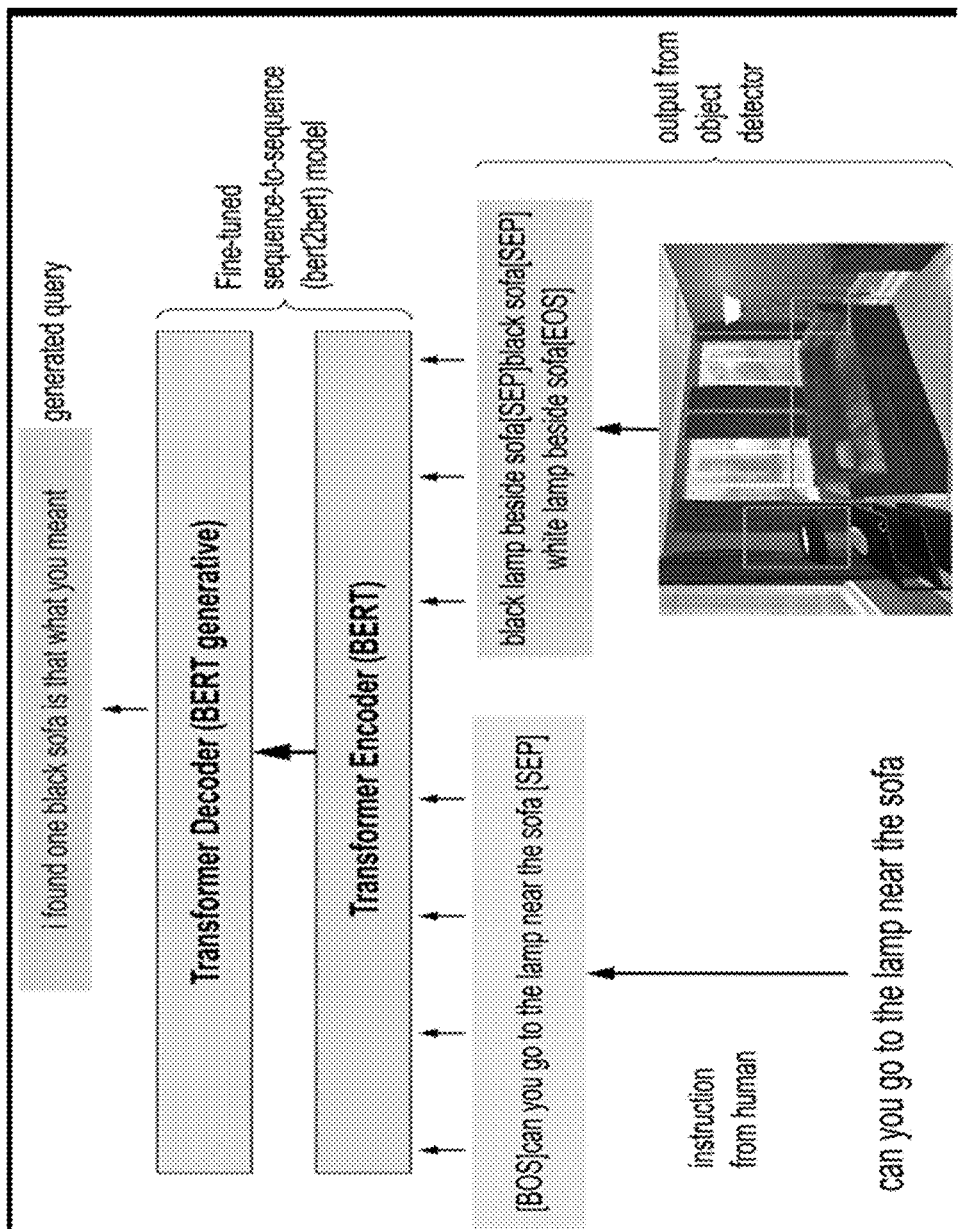
FIG. 2, with reference to FIG. 1, depicts a block diagram of an architecture as implemented by the system of 100 of FIG. 1 for disambiguation of referred objects for embodied agents, in accordance with an embodiment of the present disclosure.

FIG. 2, with reference to FIG. 1, depicts a block diagram of an architecture as implemented by the system of 100 of FIG. 1 for disambiguation of referred objects for embodied agents, in accordance with an embodiment of the present disclosure.

Figure 3:
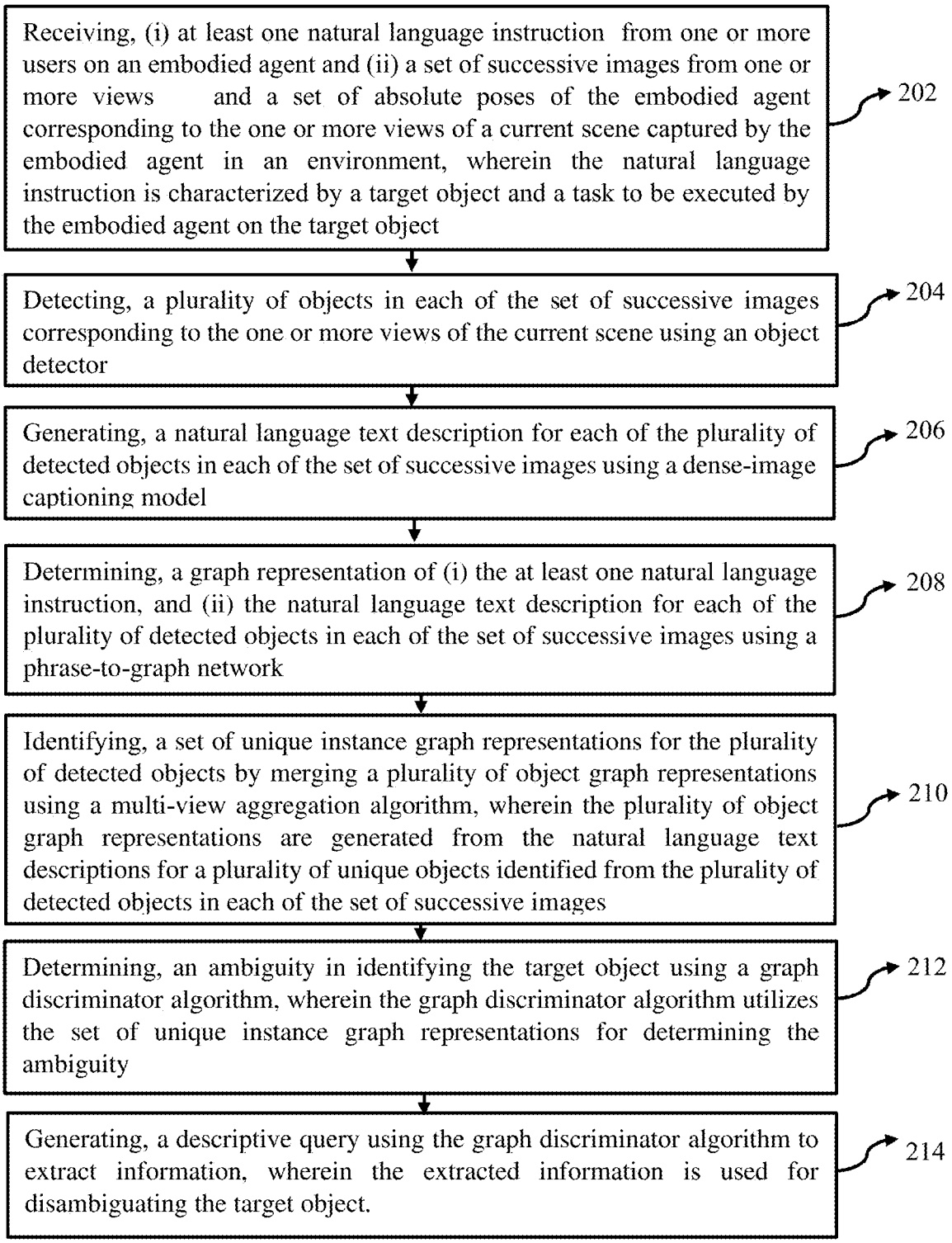
FIG. 3, with reference to FIGS. 1-2, depicts an exemplary flow chart illustrating a method 200 for disambiguation of referred objects for embodied agents, using the system 100 of FIG. 1, in accordance with an embodiment of the present disclosure.

FIG. 3, with reference to FIGS. 1-2, depicts an exemplary flow chart illustrating a method 200 for disambiguation of referred objects for embodied agents, using the system 100 of FIG. 1, in accordance with an embodiment of the present disclosure.

Referring to FIG. 3, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the block diagram of FIG. 2, the flow diagram as depicted in FIG. 3 and the block diagram of FIG. 4. In an embodiment, at step 202 of the present disclosure, the one or more hardware processors 104 are configured to receive, (i) at least one natural language instruction from one or more users on an embodied agent and (ii) a set of successive images from one or more views and a set of absolute poses of the embodied agent corresponding to the one or more views of a current scene captured by the embodied agent in an environment. The at least one natural language instruction received from the one or more users is characterized by a target object and a task to be executed by the embodied agent on the target object. In an embodiment, the target object is alternatively referred as 'referred object' in the present disclosure. In other words, the natural language instruction comprises a task and a referred object with or without attributes. In an embodiment, the one or more users my include but not limited to a human being, an external system or machine generating spoken utterances or natural language instructions, and/or the like. In an embodiment, the embodied agent could be a robot, an unmanned aerial vehicle (UAV), and/or the like. In an embodiment, the environment could be a closed space such as room, an open space such as a garden, or any other area of a house, mall, building, and/or the like. In an embodiment, the natural language instruction may include text inputs, audio-based interaction by converting an audio input to text using any state-of-the-art automatic speech recognition (ASR) system, video based interaction by converting a video input to text using any state-of-the-art system, and/or the like. FIG. 2 shows three components of the system of the present disclosure namely phrase-to-graph network, multi-view aggregation algorithm, and graph discriminator algorithm. As depicted in the block diagram of FIG. 2, a natural language instruction 'Can you got the lamp near to the sofa?' is received from a human instructor (refer to left side of the block diagram of FIG. 2) and three images are received (refer to right side of the block diagram of FIG. 2). In an embodiment, the images (alternatively referred as frames) comprised in the set of successive images are RGB-D images.

In an embodiment, at step 204 of the present disclosure, the one or more hardware processors 104 are configured to detect a plurality of objects in each of the sets of successive images corresponding to the one or more views of the current scene using an object detector. The embodied agent (hereafter referred as agent throughout the description) does not have any prior knowledge about where exactly the plurality of objects are located in the environment (say inside a room) or how many instances of the plurality of objects are there if at all. Moreover, if area within the environment is large enough, a single view from the agent's camera may not be sufficient to locate all the objects. Thus, the agent performs an exploration of the area to collect observations. Each observation records the agent's relative pose change and RGB-D image.

In an embodiment, at step 206 of the present disclosure, the one or more hardware processors 104 are configured to generate a natural language text description for each of the plurality of detected objects in each of the set of successive images using a dense-image captioning model. The RGB images corresponding to each view are processed to identify the plurality of objects and their attributes within a set of 2D bounding boxes. This is performed by generating a natural language description (i.e., caption) of a given bounding box. It must be appreciated that the dense-image captioning model is a state in the art method and any state of the art object detection methods could be used in the present disclosure.

In an embodiment, at step 208 of the present disclosure, the one or more hardware processors 104 are configured to determine a graph representation of (i) the at least one natural language instruction, and (ii) the natural language text description for each of the plurality of detected objects in each of the set of successive images using a phrase-to-graph network. As shown in FIG. 2, the phrase-to-graph network (refer to left side of the block diagram in FIG. 2) comprises: a transformer-based pre-trained BERT model, a feed-forward network with softmax layer, and a tag to graph grammar module. The transformer-based pre-trained BERT model is used to provide a contextual hidden representation $h_i$ for each input token $t_i$ comprised in (i) at least one natural language instruction and (ii) the natural language text description for each of the plurality of detected objects in each of the set of successive images. The feed-forward network with softmax layer predicts a sequence of labels for each input token $t_i$ from a set of graph related symbols by determining a probability distribution of the contextual hidden representation $h_i$ for each input token $t_i$ over the set of graph related symbols. The tag to graph grammar module is referred to as a set of static rules to construct the graph representation of (i) at least one natural language instruction and (ii) the natural language text description for each of the plurality of detected objects in each of the set of successive images using a deterministic top-down parsing algorithm from the predicted sequence of labels. In an embodiment, the graph representation of (i) at least one natural language instruction, and (ii) the natural language text description for each of the plurality of detected objects in each of the set of successive images comprises a root node representative of the target object and a plurality of edges representative of one or more self attributes and one or more relational attributes of the target object. In the context of present disclosure, the graph representation of the natural language instruction is alternatively referred to as input graph and the graph representation of the natural language text description for each of the plurality of detected objects is alternatively referred as object graph in the description.

In other words, in the present disclosure, a semantic representation of an object in the form of a graph is maintained. Thus, the natural language description of an object is converted to a graph. In an embodiment, general structure of the object graph is a tree with class of the referred object in the root, r(g). Root node comprises children that encode attribute types of the referred object. There are two types of attribute nodes namely self-attributes $at_S$ and relational attributes $at_R$. Each self-attribute $at_S$ comprises a single child as a leaf node ay s denoting value (also referred as token) of the self-attribute type. Each self-attribute $at_S$ encodes a physical (self) attribute type of the object such as color, material, and/or the like while the corresponding leaf node holds the token of the type (e.g., red, black, white) for color, and (e.g., wooden, metal, glass) for the material. Each relation attribute $at_R$ describes a spatial relationship with another object node. The relation attribute $at_R$ comprises a child node denoting the class of the object in relation to $av_R$, having its own $at_S$ and $at_R$ nodes. In the present disclosure, a two-stage pipeline is used to convert a natural language text into an object graph. In the first stage, a sequence tagger jointly predicts the referred object class, the attribute types, and their values. Given a sequence of tokens $\{t\}_{i=0}^n$, the sequence tagger predicts a sequence of labels $\{l\}_{i=0}^n = 0$ from a set of symbols C, where $C=\{r(g), \{at_S\} \cup \{at_R\}, \{av_S\}, \{av_R\}, o\}$. Here, o denotes a non-relevant token and $\{at_S\} \cup \{at_R\}$ is the union of all self and relational attribute types considered. The present disclosure uses a model that supports arbitrary self and relational attributes by building a set $\{at_S\} \cup \{at_R\}$ from a given training data. To handle nodes with multi-token text spans, a well-known Begin-Inside-Outside (BIO) tagging scheme is used, expanding C with B- and I prefixes. The sequence tagger is modelled as a transformer network and contextual hidden representation $h_i$ for each input token $t_i$ is obtained using the transformer-based pre-trained BERT model as provided in equation (1) below:

$$h_i = [\text{BERT}(t_i)] \quad (1)$$

The hidden vector is fed to the feed-forward layer with softmax to produce a probability distribution over C for each token. Finally, a label sequence $l_{1:n}$ is obtained by greedy decoding as shown in equation (2) below:

$$l_{1:n} = \underset{l_i \in C}{\arg\max} P(l_i \mid FFN(h_i)) \quad (2)$$

Given the predicted label sequence, the object graph is constructed using a deterministic top-down parsing algorithm. Following the formal structure of the object graph defined above, a parsing grammar (the tag-to-graph grammar module as shown in FIG. 2) is formulated. A simplified form of the parsing grammar is provided in following equations (3).

$$r(g) \to at_S * | av_R, at_S \to av_S, at_R \to av_R, av_R \to at_S * | av_R \quad (3)$$

In an embodiment, at step 210 of the present disclosure, the one or more hardware processors 104 are configured to identify a set of unique instance graph representation s for the plurality of detected objects by merging a plurality of object graph representations using a multi-view aggregation algorithm (refer left side of the block diagram in FIG. 2). In an embodiment, the plurality of object graph representations is generated from the natural language text descriptions for a plurality of unique objects identified from the plurality of detected objects in each of the set of successive images. In an embodiment, at first step of the multi-view aggregation algorithm a three-dimensional (3D) point cloud of each detected object from the plurality of detected objects in each of the set of successive images is obtained. Further, a dense occupancy two-dimensional (2D) grid map is generated for each detected object from the plurality of detected objects in each of the set of successive images. Here, the dense occupancy 2D grid map is generated by discretizing the 3D point cloud of each detected object into a voxel grid and determining a top-down bird's eye view (BEV) projection of the voxel grid. Further, a set of objects which have same object graph representation are identified from the plurality of detected objects in each of the set of successive images.

For example, if a current image of a scene from one view comprises a black lamp and two white lamps and a subsequent image of the scene from another view comprises a red ball and a white lamp at same instance as in the current image, then the white lamp is identified as the object same object graph representation. The dense occupancy 2D grid maps for the set of objects having same object graph representation are aggregated to obtain a single dense occupancy 2D grid map corresponding to each of a set of unique object graph representations. In an embodiment, the unique object graph representations are the graph representation of the unique object. The unique object is explained with the help of an example. For example, if a current image of a scene from one view comprises four objects and a next image of the scene from another view comprises three objects in which one object was present in the current frame at same instance. Then the total number of unique objects combined from the current and next frame is seven instead of eight. The common object in both the images is considered as one unique object only. Further, an occupancy score is determined for each of a plurality of regions defined on each dense occupancy grid map corresponding to each of the set of unique object graph representations by summing a plurality of grid cell weights within each region, wherein each of the grid cell weights are indicative of average weight of points in the grid cell. Furthermore, a normalized occupancy score distribution over each of the dense occupancy grid maps corresponding to each of the set of unique object graph representations is determined by analyzing intensity of the plurality of grid cells on the grid map. The normalized occupancy score distribution is used to find local maxima that approximately localizes one or more instances of each of the set of unique object graph representations. After determining the normalized occupancy score distribution, a unique instance graph representation for the target object is determined by stacking each of the dense occupancy grid maps corresponding to each of the set of unique object graph representations on top of the other, and then max-pooling along the stacked dimension.

The steps 202 through 210 are further better understood by way of the following exemplary explanation.

Figure 4:
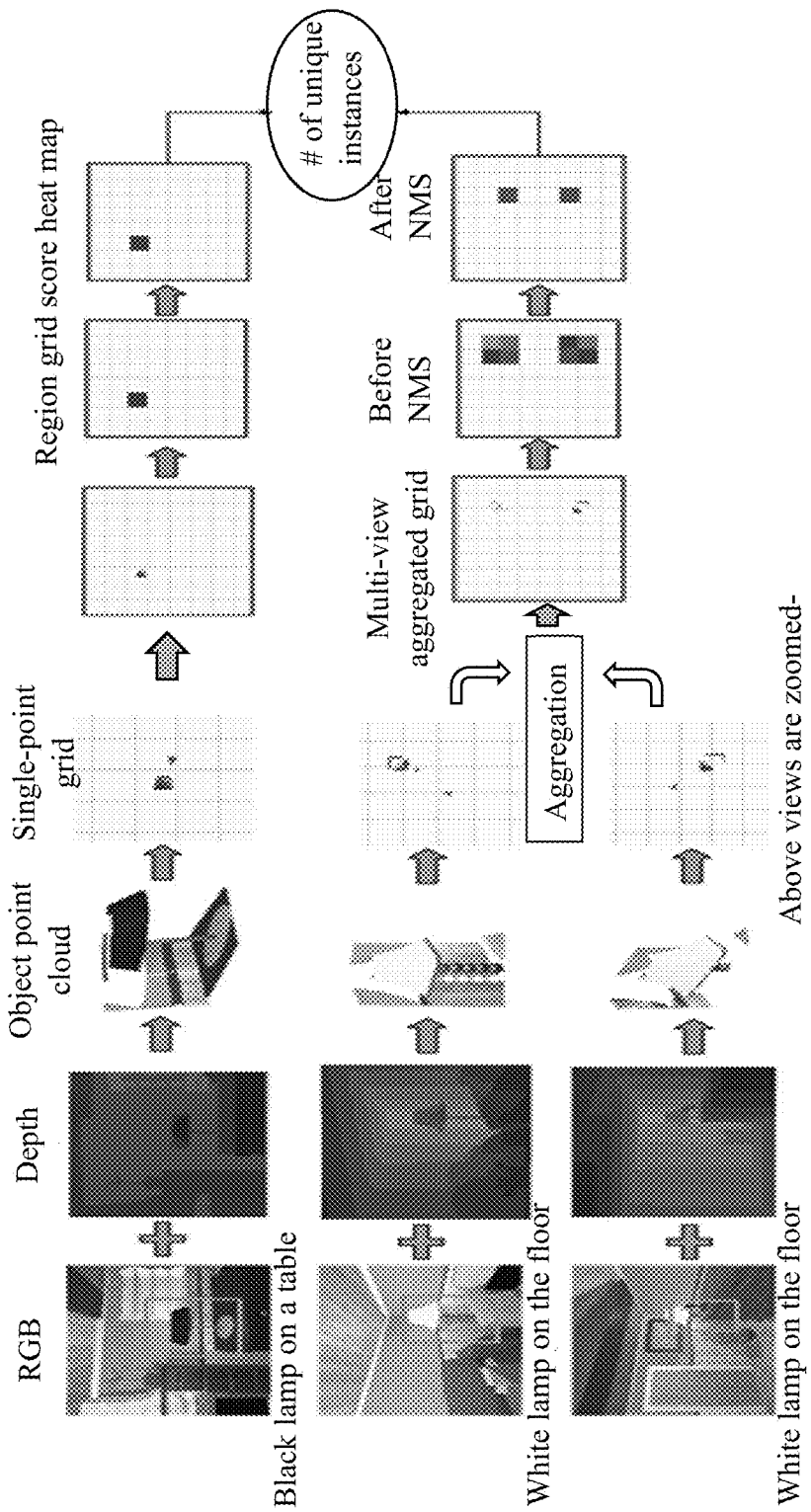
FIG. 4 is a functional block diagram illustrating spatio-temporal object tracking from multiple views of an explored area for disambiguation of referred objects for embodied agents according to some embodiments of the present disclosure.

In the present disclosure, given a sequence of RGB-D images and absolute poses of the agent obtained from local exploration, the objective is to uniquely identify a particular object instance along with its spatial and physical attributes. FIG. 4 is a functional block diagram illustrating spatio-temporal object tracking from multiple views of an explored area for disambiguation of referred objects for embodied agents according to some embodiments of the present disclosure. As shown in FIG. 4, for each RGB-D image frame $f_i$ and an absolute camera pose at time-step t, each point $p_i(u_i; v_i)$ on the image frame $f_i$ has an associated depth value $d_i$. In the present disclosure, an off-the-shelf 2D object detector is used to detect relevant objects in the RGB frame $f_i$. Given history of observations, the method of the present disclosure projects masked point clouds of the 2D bounding boxes into a grid-map and approximately localizes possible instances of the referred object. This process helps to merge instance graphs across observations and provides only unique instance graph(s). The instance graph is generated from the generated caption of a single observation and object graphs at different instances are referred as object instance graphs. Based on knowledge of camera intrinsic matrix K, each image point $p_i$ lying inside the bounding box of the detected object can be projected into camera coordinates 3D space as $P_i^c$ in accordance with equation (4) provided below as:

$$P_i^c(x_i, y_i, z_i) = K^{-1}(u_i, v_i, d_i) \quad (4)$$

Thus, from the camera coordinates space, the point cloud $P^C$ is transformed to world coordinates space Pw using the absolute pose of the agent at that time-step as shown in equation (5) below:

$$[x_i^w \ y_i^w \ z_i^w]^T = \begin{bmatrix} R & t \\ 0 & 1 \end{bmatrix} [x_i^c \ y_i^c \ z_i^c]^T \quad (5)$$

Here in equation (5), R and t refer to rotation matrix and translation vectors corresponding to the absolute pose with respect to world origin. The bounding box of a detected object also contains background of the object. Even when a segmentation mask is available, it can be inaccurate near boundaries. So, a soft-mask approach is used where points inside the bounding box of the object are weighted using a 2D Gaussian function to weigh the centers of the objects more than the boundaries and the background as shown in equation (6) below:

$$w_{u,v} = \frac{1}{2 * \sigma_u \sigma_v} \exp \frac{-1}{2} \left[ \frac{(u - u_c)^2}{\sigma_u^2} + \frac{(v - v_c)^2}{\sigma_v^2} \right] \quad (6)$$

Here in equation (6), $(u_c, v_c)$ is center of the bounding box in image coordinates. The values of $\sigma_u$ and $\sigma_v$ are chosen empirically. It is found that it helps suppress erroneous predictions as edges of the bounding box are less likely to lie on the object. As each 2D point $p_i$ has a corresponding 3D point $P_i^w$ in world coordinates space, so each $P_i^w$ will also have an associated weight $w_i$. The object point cloud is then discretized into a voxel grid and its top-down bird's eye view (BEV) projection is taken to form a 2D occupancy grid map. The average weight of the points in a grid cell is assigned as the weight of that grid cell. For each detected object in each successive frame in the RGB-D sequence, the natural language description of the object (if the 2D object detector is a dense caption predictor) is converted to an object graph using the same sequence tagging followed by parsing pipeline implemented by the phrase to graph network. Otherwise, the attributes of the object are formally represented as the object graph (if using an object-cum-attribute detector). If the object graph formed is a new one then it is assigned an auto-incremental unique ID $o_id_i$ or else if it is similar to an existing object graph in the Hashmap (or database), then it is assigned the same ID. For efficient storage and retrieval, the object graph ids, grid map cells, and their weights are stored in two Hashmap data structures which have an expected storage and retrieval time complexity of O(1). The first Hashmap stores the object ID $oid_i$ as key and a list of grid cell coordinates $(x_j^g, y_j^g)$ of the BEV projection of the object point cloud as values where $0 <= j <= m$ and m is total number of grid cells pertaining to an object. For example, $oid_i \rightarrow [(x_1^g, y_1^g),(x_2^g, y_2^g),(x_3^g, y_3^g) \dots ]$. The second Hashmap is a sparse occupancy map data structure where the grid cell coordinates $(x_j^g, y_j^g)$ are the keys and their weights $w_i^g$ and the total number of detections (i.e., frequency) $freq_i^g$ of the same object graph till the current time-step are the values. For example, $(x_1^g, y_1^g) \rightarrow (w_i^g, freq_i^g)$. So, for each unique object graph having a unique id, the dense occupancy 2D grid maps are generated from the set of grid map cells associated with it. Now, there can be multiple instances of the same object (or object graph) in the scene (e.g., a white lamp on the floor). To find out number of unique instances, an approach is formulated that analyzes the grid cell weight intensities on the grid map to find the local maxima that approximately localize object instance graphs $\{Ig_i\}_{i=0}^n$. Here, n is the number of object instances in the explored area. Firstly, a physical region R=(dx; dy) is defined on the grid map with the following assumptions.

1) A region R contains at most one instance graph, $Ig_i$. In other words, we assume no ambiguity within a region of size (dx; dy), where dx and dy are the size of R along the x and y-axis on the occupancy grid-map.
2) Each $Ig_i$ is localized by m regions that are mutually neighbors, where $m \geq 1$.

Irrespective of object classes, no upper bound of m is assumed.

Next, the occupancy score for all the regions is obtained by summing the grid cell weights within a region and then normalizing as shown in equation (6) below:

$$O(R)_k = \frac{\sum_{j=1}^{dxXdy} w_{bin(j)}}{\sum_{k=0}^{(d1Xd2)/(dx+dy)} \sum_{j=1}^{dxXdy} w_{bin(j)}} \quad (6)$$

Here, d1×d2 is the size of the grid-map. The normalized occupancy score distribution over the grid map approximates probability of finding any instance of a given object class which is the root of the object instance graph in a region, $P(r(g) \in R_k)$. However, there is no prior of m, a greedy non-maximal region merging algorithm is devised to merge neighboring regions, while pruning noisy regions from the map. The greedy non-maximal region merging algorithm performs a merging and noise suppression process.

The merging and noise suppression process in the greedy non-maximal region merging algorithm can be further better understood by way of following pseudo code provided as example.

The entire approach/method of the present disclosure can be further better understood by way of following pseudo code provided as example:

```
Input: Occupancy score matrix as vector: O
Initialization: merged = Ø
1. Obtain a vector of region indices R⃗I by sorting Oin descending order
2. for index ∈ R⃗I and index ∉ merged do
       // Noise suppression
3.     if O(index) < γ then
4.         O(index) = 0
5.     end
6.     else
           // Neighbour merging
7.         next-best = R⃗I[index+1]
8.         if is – neighbour(index, next – best) then
9.             O[next-best] = O(index)
10.            merged.add(next-best)
11.        end
12.        else
14.            for j in merged do
15.                if is – neighbour(j, index) then
16.                    O(index) = O(j)
17.                    break
18.                end
19.            end
20.        end
21. end
Output: Merged region scores
```

Referring back to FIG. 3, at step 212 of the present disclosure, the one or more hardware processors 104 are configured to determine an ambiguity in identifying the target object using a graph discriminator algorithm. In an embodiment, the graph discriminator algorithm utilizes the set of unique instance graph representations for determining the ambiguity. In other words, given an input graph and the unique instance graph(s), the system of the present disclosure decides if an unambiguous grounding of referring expression of the target object is possible by using the graph discrimination algorithm. Further, at step 214 of FIG. 3, the one or more hardware processors 104 are configured to generate a descriptive query using the graph discriminator algorithm to extract information. The extracted information is used for disambiguating the target object. In other words, in case of ambiguity, the graph discriminator algorithm also generates a descriptive query by using mutually discriminative attributes of the set of unique instance graph representations. In an embodiment, the graph discriminator algorithm first determines a set of discriminative instance graph representations by computing a pairwise set difference between the graph representation of at least one natural language instruction and each of the set of unique instance graph representations of the plurality of detected objects. Further, information comprised in the one or more natural language instructions for identifying the target object is classified into one of (i) a confirm state based on a comparison of cardinality of the set of discriminative instance graph representations with a first predefined value (ii) a mismatch state, and (iii) an ambiguous state based on a comparison of cardinality of the set of discriminative instance graph representations with a second predefined value, and (iv) a missing state based on a comparison of cardinality of the set of unique instance graph representations with the first predefined value. In an embodiment, the value of the first predefined value is '0' and the second predefined value is '1'. Furthermore, the ambiguity in identifying the target object is determined based on the classified state.

The steps 212 and 214 are further better understood by way of the following exemplary explanation.

The graph discriminator algorithm serves both the purposes of ambiguity detection and query generation jointly.

1) Ambiguity identification: Given an input graph g and a set of unique instance graph representations obtained from metric grid-map $\{I_g\}$, the set of discriminative instance graph representations $\{I_g'\}$ is computed. For each generated unique instance graph representation, a pairwise set difference with g is computed and empty results are removed as shown in equation (7) below:

$$\{I_g' = (g - Ig_i), Ig_i' \neq \emptyset\}_{i=0}^{n} \quad (7)$$

By generating the pairwise symmetric difference set, the information comprised in the one or more natural language instructions for identifying the target object is classified into one of the four states. The confirm state (i.e., exact match) is identified when the cardinality of the set of discriminative instance graph representations is '0'. Otherwise, the cardinality of the set of discriminative instance graph representations is used to decide between the mismatch state and the ambiguous state. The mismatch state (i.e., INFORM-MISMATCH) is identified when the cardinality of the set of discriminative instance graph representations is equal to '1' and the ambiguous state (i.e., INFORM-AMBIGUITY) is identified when the cardinality of the set of discriminative instance graph representations is greater than '1' as shown below:

$(|\{Ig'\}|=1) \rightarrow$ INFORM-MISMATCH, $(|\{Ig'\}|>1) \rightarrow$ INFORM-AMBIGUITY The missing state (i.e., INFORM-MISSING) is identified when the cardinality of the set of unique instance graph representations (i.e., $\{I_g\}=\emptyset$) is '0'.

2) Query generation: The question is crafted to convey the agents's partial understanding from the exploration and describe the source of ambiguity/mismatch in natural language. To generate such pin-pointed questions, a set of question templates is used in the present disclosure. Furthermore, a language model based approach is used to generate the questions dynamically and make them seem natural. Table 1 below shows the question templates and their mapping with the states.

TABLE 1

| State | Question Template |
|---|---|
| INFORM-MISMATCH | I found one [graph description] [random mismatch-suffix] |
| INFORM-AMBIGUITY | I found one [graph description]$^+$ [, and]$^+$ [random wh-suffix] |
| CONFIRM | [random acknowledgement phrase] |
| INFORM-MISSING | I could not find that |

Each template contains slots that are replaced by a natural language description of an object graph. To generate the description of object graphs, we the parsing grammar with rules is augmented that annotate the edges of the object graph (tree) with surface forms, edge $\in at_S \cup at_R$. For example, the is-on relationship is converted to the surface form 'on top of' and color is converted to an empty string. The nodes already contain surface forms as tokens. Following the English grammar, an ordering of the edges is maintained such that any $at_R$ edge is always on the right of an $at_S$ edge. Therefore, a pre-order traversal of the tree produces the description of the object graph in English.

Experimental Results:

The system of the present disclosure is evaluated using the AI2Thor simulator. It must be appreciated that the AI2Thor simulator is a known in the art simulator. The AI2Thor simulator allows an embodied agent to explore within a geofence of different rooms and capture RGBD observations. It also provides object metadata and rendering of an oracle object detector. To validate this, the present disclosure discusses construction of an evaluation dataset and experiments performed on it.

Dataset

In the present disclosure, the dataset is built focusing on some important assumptions. Components of the dataset are described below:

a) Object types: Based on an assumption that the method of the present disclosure is agnostic to object shape and size, a subset of the AI2Thor provided object types is selected accordingly. A mixture of small, medium, and large-sized objects such as cup, laptop, and sofa are selected. Also, both convex objects such as book, pillow, and/or the like and non-convex objects such as chair, plant, and/or the like are selected. In the present disclosure, objects that always occur exactly once (e.g., television, fridge) are purposefully excluded to avoid bias. However, the system of the present disclosure works in a similar manner for any such objects as long as the object detector can detect them.

b) Room types: In the present disclosure, experiments with three types of rooms—kitchen, living room, and bedroom available in ai2thor are conducted. However, bathrooms are omitted from the evaluation as entire room is often visible from a single view. The system of the present disclosure work in a similar way for smaller rooms as well. Five rooms from the bedroom set are sampled to use as a validation set to optimize hyper-parameters. For test data, initially 17 rooms from the kitchen and 17 rooms from living rooms are sampled in their default configuration. In the default configuration, very few objects occur in multiple instances, which leads to fewer ambiguities. Thus, copies of different object instances in random are produced that have visible locations. Further 68 different room configurations, each containing multiple copies (≤5) of a particular object, are obtained.

c) Instructions: The instructions are automatically generated by generating referring expressions and putting them in instruction templates of different verbs. For a given room, for each object present in the room, a referring expression is constructed using the AI2Thor simulator-provided metadata. Specifically, for each object class, following three types of referring expressions are constructed.

Referring with a self-attribute, e.g., pick up a plastic cup.
Referring with both self and relational attribute, e.g., take the plastic cup on the table.
Referring only with the object name, e.g., bring a cup.

Evaluation of Phrase-to-Graph Network

In the present disclosure, pairs of text and labels are automatically generated to train the transformer-based sequence tagger. Templates are defined with several variants of surface forms of instructions and referring expressions with slots for self and relational attributes. Then permutations of the templates are generated by selecting random tokens from sets of predefined attributes. The text samples are constructed with two self-attribute types—color and material; and three relational attribute types—is-near, is-on and is-at. A total of 6305 text-label sequence pairs are generated. 20% of the generated data is kept as a validation set and the rest is used to fine-tune the BERT transformer along with the tagger network. 15 epochs are trained with a learning rate of $5e^{-5}$. The phrase to graph network is tested on manually annotated test data, which contains 110 pairs of text and label sequences with a total of 590 token-label pairs to predict. In the present disclosure, an experiment with a similar Bi-LSTM network with pre-trained GloVe embedding was also conducted and it was found that the BERT-based approach generally works better. Results of the c and the BERT-based sequence taggers are provided in Table 2 in terms of F1 score.

In other words, Table 2 provides F1 scores of label prediction by the BI-LSTM network and the BERT-based sequence taggers. Here, boldface numbers are the highest in a row.

Evaluation of Multi-View Aggregation Algorithm

The present disclosure reports results of object instance detection from the metric grid map. In the present disclosure, a ground truth (GT) 2D object detector in AI2Thor is primarily used. However, to emulate the behavior of a practical object detector, following types of errors are modelled and applied to the GT object detector:

a. Centroid Shift ($E_{CS}$): Even though the object class is detected correctly, standard object detectors can still fail to recognize object boundaries perfectly. To emulate this, centroid of a GT bounding box is randomly shifted keeping its shape intact. Further, a shift in pixels with respect to the GT bounding box's area from a normal distribution ($\mu_C$, $\sigma_C$) is randomly sampled. Then a random direction from four quadrants is selected and the shift is applied.

b. Shape Distortion ($E_{SD}$): To further analyze the effect of poor object boundary prediction in the present disclosure, width and the height of the GT bounding box is randomly increased and decreased and percentage of change is sampled from normal distribution ($\mu_S$, $\sigma_S$).

c. False Negatives ($E_{FN}$): In the present disclosure, false negatives are emulated by randomly deleting GT bounding boxes with a probability $P_{FN}$. Here false negatives indicate failing to predict an object despite being present in the scene.

d. False Positives ($E_{FP}$): Similarly, false positives are emulated (even though they are not present in any scene) by randomly introducing bounding boxes with captions in a scene with a probability $P_{FP}$. Here false positives indicate falsely predicting an object. To introduce a random misprediction, first a different room in AI2Thor is randomly sampled. Then, a caption and a corresponding bounding box is randomly selected from a random observation in the other room and overlaid on current RGBD observation frame.

In the present disclosure, goal of multi-view aggregation is to correctly find the unique object instances. If the multi-view aggregation algorithm finds more object instances than the ground truth, it can lead to ambiguity. Similarly, if the multi-view aggregation algorithm suggests less number of object instances than actual, then it may not capture underneath ambiguity. F1 scores of object instance counting for GT object detection and different error models are provided in Table 3. The error model parameters are: ($\mu_C$=0.2, $\sigma_C$=0.04),($\mu_S$=0.2, $\sigma_S$=0.04),($P_{FN}$=0.15), ($P_{FP}$=0.15).

TABLE 2

| Label | BI-LSTM network | BERT-based sequence tagger |
|---|---|---|
| B - r(g) | 0.94 | 0.97 |
| I - r(g) | 0.82 | 0.80 |
| B - $av_R$ | 0.96 | 0.97 |
| I - $av_R$ | 0.67 | 0.84 |
| B-color ∈ $at_S$ | 0.94 | 0.92 |
| I-color ∈ $at_S$ | 0.84 | 0.86 |
| B-material ∈ $at_S$ | 0.94 | 0.95 |
| B-is-near ∈ $at_R$ | 0.89 | 0.93 |
| B-is-on ∈ $at_R$ | 0.97 | 0.99 |
| B-is-at ∈ $at_R$ | 0.89 | 0.95 |
| Weighted avg. | 0.93 | 0.94 |

TABLE 3

| # instances | GT | $E_{CS}$ | $E_{CS} + E_{SD}$ | $E_{CS} + E_{SD} + E_{FN}$ | $E_{FP}$ |
|---|---|---|---|---|---|
| 1 | 0.97 | 0.95 | 0.95 | 0.95 | 0.88 |
| 2 | 0.88 | 0.84 | 0.87 | 0.81 | 0.58 |
| 3 | 0.84 | 0.83 | 0.80 | 0.76 | 0.53 |
| AVG. | 0.91 | 0.89 | 0.90 | 0.87 | 0.74 |

Table 3 shows F1 scores for object instance counting after aggregation for the ground truth object detector and various noisy detectors. It is observed in the present disclosure that even if the GT object detector is used, the number of object count is impacted due to the noise introduced by the aggregation mechanism. However, the noisy object detector has minimal impact as the aggregation almost cancels out the noise. Even though the false positive (FP) scenario is the worst affected, any recent state-of-the-art object detector has minimal FP cases.

Evaluation of the Overall System

Figure 5:
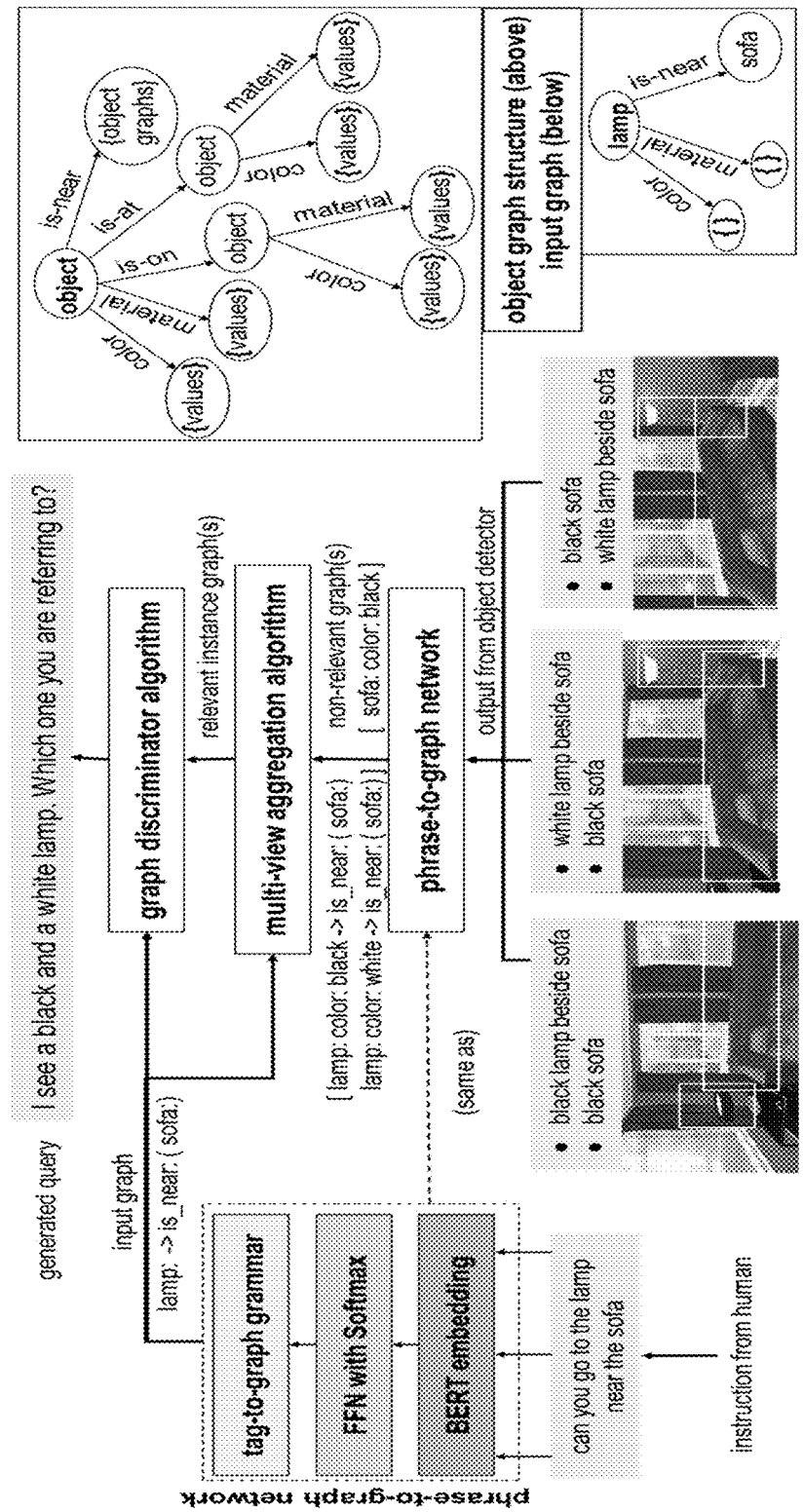
FIG. 5 is a block diagram of a network architecture diagram of a baseline system for ambiguity detection and query generation created by fine-tuning a bert-2-bert based encoder-decoder model according to some embodiments of the present disclosure.

The method of the present disclosure is compared against a baseline system that can detect ambiguity and generate queries only from a single observation. FIG. 5 is a block diagram of a network architecture diagram of a baseline system for ambiguity detection and query generation created by fine-tuning a BERT-2-BERT based encoder-decoder model according to some embodiments of the present disclosure. As shown in FIG. 5, a pre-trained BERT model is used to fine-tune the baseline system. The training data is same as in the model of the present disclosure. The baseline system is compared with the system of the present disclosure in terms of ambiguity and generated query. The generated queries of both systems are compared against a reference query. Firstly, a BLEU score is calculated to find token level similarity of the generated query. Then, a semantic similarity (alternatively referred as BERT score) is determined by using a BERT-based sentence level similarity score. Then, the F1 score is calculated for finding the ambiguity (ambiguity accuracy—AA). However, an ambiguity may be erroneously triggered for a completely different reason. This may lead to incorrect query generation and failure in disambiguation. Thus, accuracy of the generated query (QA) is checked manually as well. In the present disclosure, the GT object detector is used in combination with $E_{CS}+E_{SD}+E_{FN}$ errors. A total of 600 image sequence and instruction pairs are used for evaluation in the present disclosure.

The present disclosure assumes a setup where the robot is either static or a single view is sufficient for grounding the referred object. In such a scenario, how good is the ambiguity detection and the generated query has to be determined. Table 4 provides a comparison of the system of the present disclosure with respect to the baseline system, for a single image, in terms of describing the ambiguity.

TABLE 4

| metric | BELU score | BERT score | AA | QA |
|---|---|---|---|---|
| Baseline | 0.75 | 0.82 | 0.92 | 0.45 |
| System of the present disclosure | 0.81 | 0.90 | 0.94 | 0.85 |

It is observed during evaluation that the baseline system even if detecting ambiguity with high precision fails to generate an accurate query for the same. This happens since the query generation draws the tokens from language model in the decoder. Hence, the system of the present discourse prefers most likely token rather than context-specific token. As a result of it, even if the language model predicts a grammatically and semantically accurate query, the information conveyed is wrong. This poor accuracy leads to poor disambiguation.

The present disclosure further summarize results for more practical scenario where multiple views are required to assess the scenario properly. Table 5 provides a comparison of performance of the system of the present disclosure (end-to-end) with aggregated data from multiple views with a single-view image with maximum number of target object instance(s).

TABLE 5

| metric | BELU score | BERT score | AA | QA |
|---|---|---|---|---|
| Baseline (single random view) | 0.64 | 0.70 | 0.90 | 0.37 |
| System of the present disclosure (single random view) | 0.71 | 0.84 | 0.87 | 0.69 |
| System of the present disclosure (multi-view) | 0.77 | 0.87 | 0.91 | 0.77 |

It is observed from Table 5 that for the baseline system, the single view works fine. Thus, a random view is chosen from the set of images with at least one referred object instance available in the image. Further, it is observed from Table 5 that both the baseline system and the system of the present disclosure perform poorly in terms of the accuracy of the query. However, it is also observed that the system of the present disclosure performs way better than the baseline system and after aggregation, the accuracy of the system of the present disclosure improves significantly.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of present disclosure provide a system and method to tackle the object disambiguation task for an embodied agent. With the phrase-to-graph network disclosed in the system of the present disclosure, any natural language object description can be converted into a semantic graph representation (say, object graph). This not only provides a formal representation of the referred object and object instances but also helps to find the ambiguity using discrimination. Further, a real-time multi-view aggregation algorithm is described in the method of the present disclosure that processes multiple observations from the environment and finds the unique instances of the referred object. The method of the present disclosure demonstrates significant improvement in qualifying ambiguity detection with accurate, context-specific information so that it is sufficient for a user to come up with a reply towards disambiguation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object;
   detecting, via the one or more hardware processors, a plurality of objects in each of the set of successive images corresponding to the one or more views of the current scene using an object detector;
   generating, via the one or more hardware processors, a natural language text description for each of the plurality of detected objects in each of the set of successive images using a dense-image captioning model;
   determining, via the one or more hardware processors, a graph representation of (i) the at least one natural language instruction, and (ii) the natural language text description for each of the plurality of detected objects in each of the set of successive images using a phrase-to-graph network;
   identifying, via the one or more hardware processors, a set of unique instance graph representations for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images;
   determining, via the one or more hardware processors, an ambiguity in identifying the target object using a graph discriminator algorithm, wherein the graph discriminator algorithm utilizes the set of unique instance graph representations for determining the ambiguity; and
   generating, via the one or more hardware processors, a descriptive query using the graph discriminator algorithm to extract information, wherein the extracted information is used for disambiguating the target object.

2. The processor implemented method of claim 1, wherein the phrase-to-graph network comprises:
   a transformer-based pre-trained BERT model to provide a contextual hidden representation $h_i$ for each input token $t_i$ comprised in (i) at least one natural language instruction, and (ii) the natural language text description for each of the plurality of detected objects in each of the set of successive images;
   a feed-forward network with softmax layer to predict a sequence of labels for each input token $t_i$ from a set of graph related symbols by determining a probability distribution of the contextual hidden representation $h_i$ for each input token $t_i$ over the set of graph related symbols; and
   a tag to graph grammar module to construct the graph representation of (i) at least one natural language instruction, and (ii) the natural language text description for each of the plurality of detected objects in each of the set of successive images using a deterministic top-down parsing algorithm from the predicted sequence of labels.

3. The processor implemented method of claim 1, wherein the graph representation of (i) at least one natural language instruction, and (ii) the natural language text description for each of the plurality of detected objects in each of the set of successive images comprises a root node representative of the target object and a plurality of edges representative of one or more self attributes and one or more relational attributes of the target object.

4. The processor implemented method of claim 1, wherein the multi-view aggregation algorithm comprising the steps of:

obtaining a three-dimensional (3D) point cloud of each detected object from the plurality of detected objects in each of the set of successive images;

generating, a dense occupancy two-dimensional (2D) grid map for each detected object from the plurality of detected objects in each of the set of successive images, wherein the dense occupancy 2D grid map is generated by discretizing the 3D point cloud of each detected object into a voxel grid and determining a top-down bird's eye view (BEV) projection of the voxel grid;

aggregating, the dense occupancy 2D grid maps for a set of objects from the plurality of detected objects in each of the set of successive images which have same object graph representation to obtain a single dense occupancy 2D grid map corresponding to each of a set of unique object graph representations;

determining an occupancy score for each of a plurality of regions defined on each dense occupancy grid map corresponding to each of the set of unique object graph representations, by summing a plurality of grid cell weights within each of the plurality of regions, wherein each of the grid cell weights are indicative of average weight of points in the grid cell;

determining a normalized occupancy score distribution over each of the dense occupancy grid maps corresponding to each of the set of unique object graph representations by analyzing intensity of the plurality of grid cells on the grid map, wherein the normalized occupancy score distribution is used to find local maxima that approximately localizes one or more instances of each of the set of unique object graph representations; and determining a unique instance graph representation for the target object by stacking each of the dense occupancy grid maps corresponding to each of the set of unique object graph representations on top of the other, and then max-pooling along the stacked dimension.

5. The processor implemented method of claim 1, wherein the graph discriminator algorithm comprising:

determining, a set of discriminative instance graph representations by computing a pairwise set difference between the graph representation of at least one natural language instruction and each of the set of unique instance graph representations of the plurality of detected objects;

classifying, information comprised in the one or more natural language instructions for identifying the target object into one of (i) a confirm state based on a comparison of cardinality of the set of discriminative instance graph representations with a first predefined value, (ii) a mismatch state, (iii) an ambiguous state based on a comparison of cardinality of the set of discriminative instance graph representations with a second predefined value, and (iv) a missing state based on a comparison of cardinality of the set of unique instance graph representations with the first predefined value; and determining the ambiguity in identifying the target object based on the classified state.

6. A system, comprising:
a memory storing instructions;
one or more communication interfaces; and
one or more hardware processors coupled to the memory via the one or more communication interfaces, wherein the one or more hardware processors are configured by the instructions to:

receive (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object;

detect a plurality of objects in each of the set of successive images corresponding to the one or more views of the current scene using an object detector;

generate a natural language text description for each of the plurality of detected objects in each of the set of successive images using a dense-image captioning model;

determine a graph representation of (i) the at least one natural language instruction and (ii) the natural language text description for each of the plurality of detected objects in each of the set of successive images using a phrase-to-graph network;

identify a set of unique instance graph representation s for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images;

determine an ambiguity in identifying the target object using a graph discriminator algorithm, wherein the graph discriminator algorithm utilizes the set of unique instance graph representations for determining the ambiguity; and generate a descriptive query using the graph discriminator algorithm to extract information, wherein the extracted information is used for disambiguating the target object.

7. The system of claim 6, wherein the phrase-to-graph network comprises:

a transformer-based pre-trained BERT model to provide a contextual hidden representation $h_i$ for each input token $t_i$ comprised in (i) at least one natural language instruction, and (ii) the natural language text description for each of the plurality of detected objects in each of the set of successive images;

a feed-forward network with softmax layer to predict a sequence of labels for each input token $t_i$ from a set of graph related symbols by determining a probability distribution of the contextual hidden representation $h_i$ for each input token $t_i$ over the set of graph related symbols; and a tag to graph grammar module to construct the graph representation of (i) at least one natural language instruction, and (ii) the natural language text description for each of the plurality of detected objects in each of the set of successive images using a deterministic top-down parsing algorithm from the predicted sequence of labels.

8. The system of claim 6, wherein the graph representation of (i) at least one natural language instruction, and (ii)

the natural language text description for each of the plurality of detected objects in each of the set of successive images comprises a root node representative of the target object and a plurality of edges representative of one or more self attributes and one or more relational attributes of the target object.

9. The system of claim 6, wherein the multi-view aggregation algorithm comprising the steps of:
   obtaining a three-dimensional (3D) point cloud of each detected object from the plurality of detected objects in each of the set of successive images;
   generating, a dense occupancy two-dimensional (2D) grid map for each detected object from the plurality of detected objects in each of the set of successive images, wherein the dense occupancy 2D grid map is generated by discretizing the 3D point cloud of each detected object into a voxel grid and determining a top-down bird's eye view (BEV) projection of the voxel grid;
   aggregating, the dense occupancy 2D grid maps for a set of objects from the plurality of detected objects in each of the set of successive images which have same object graph representation to obtain a single dense occupancy 2D grid map corresponding to each of a set of unique object graph representations;
   determining an occupancy score for each of a plurality of regions defined on each dense occupancy grid map corresponding to each of the set of unique object graph representations, by summing a plurality of grid cell weights within each of the plurality of regions, wherein each of the grid cell weights are indicative of average weight of points in the grid cell;
   determining a normalized occupancy score distribution over each of the dense occupancy grid maps corresponding to each of the set of unique object graph representations by analyzing intensity of the plurality of grid cells on the grid map, wherein the normalized occupancy score distribution is used to find local maxima that approximately localizes one or more instances of each of the set of unique object graph representations; and
   determining a unique instance graph representation for the target object by stacking each of the dense occupancy grid maps corresponding to each of the set of unique object graph representations on top of the other, and then max-pooling along the stacked dimension.

10. The system of claim 6, wherein the graph discriminator algorithm comprising:
   determining, a set of discriminative instance graph representations by computing a pairwise set difference between the graph representation of at least one natural language instruction and each of the set of unique instance graph representations of the plurality of detected objects;
   classifying, information comprised in the one or more natural language instructions for identifying the target object into one of (i) a confirm state based on a comparison of cardinality of the set of discriminative instance graph representations with a first predefined value, (ii) a mismatch state, (iii) an ambiguous state based on a comparison of cardinality of the set of discriminative instance graph representations with a second predefined value, and (iv) a missing state based on a comparison of cardinality of the set of unique instance graph representations with the first predefined value; and
   determining the ambiguity in identifying the target object based on the classified state.

11. One or more non-transitory computer readable mediums comprising one or more instructions which when executed by one or more hardware processors cause:
   receiving (i) at least one natural language instruction from one or more users on an embodied agent, and (ii) a set of successive images from one or more views and a set of absolute poses of the embodied agent corresponding to the one or more views of a current scene captured by the embodied agent in an environment, wherein the at least one natural language instruction is characterized by a target object and a task to be executed by the embodied agent on the target object;
   detecting a plurality of objects in each of the set of successive images corresponding to the one or more views of the current scene using an object detector;
   generating a natural language text description for each of the plurality of detected objects in each of the set of successive images using a dense-image captioning model;
   determining a graph representation of (i) the at least one natural language instruction, and (ii) the natural language text description for each of the plurality of detected objects in each of the set of successive images using a phrase-to-graph network;
   identifying a set of unique instance graph representations for the plurality of detected objects by merging a plurality of object graph representations using a multi-view aggregation algorithm, wherein the plurality of object graph representations are generated from the natural language text descriptions for a plurality of unique objects identified from the plurality of detected objects in each of the set of successive images;
   determining an ambiguity in identifying the target object using a graph discriminator algorithm, wherein the graph discriminator algorithm utilizes the set of unique instance graph representations for determining the ambiguity; and
   generating a descriptive query using the graph discriminator algorithm to extract information, wherein the extracted information is used for disambiguating the target object.

12. The non-transitory computer readable mediums of claim 11, wherein the phrase-to-graph network comprises:
   a transformer-based pre-trained BERT model to provide a contextual hidden representation $h_i$ for each input token $t_i$ comprised in (i) at least one natural language instruction, and (ii) the natural language text description for each of the plurality of detected objects in each of the set of successive images;
   a feed-forward network with softmax layer to predict a sequence of labels for each input token $t_i$ from a set of graph related symbols by determining a probability distribution of the contextual hidden representation $h_i$ for each input token $t_i$ over the set of graph related symbols; and
   a tag to graph grammar module to construct the graph representation of (i) at least one natural language instruction, and (ii) the natural language text description for each of the plurality of detected objects in each of the set of successive images using a deterministic top-down parsing algorithm from the predicted sequence of labels.

13. The non-transitory computer readable mediums of claim 11, wherein the graph representation of (i) at least one natural language instruction, and (ii) the natural language text description for each of the plurality of detected objects in each of the set of successive images comprises a root node representative of the target object and a plurality of edges representative of one or more self attributes and one or more relational attributes of the target object.

14. The non-transitory computer readable mediums of claim 11, wherein the multi-view aggregation algorithm comprising the steps of:
- obtaining a three-dimensional (3D) point cloud of each detected object from the plurality of detected objects in each of the set of successive images;
- generating, a dense occupancy two-dimensional (2D) grid map for each detected object from the plurality of detected objects in each of the set of successive images, wherein the dense occupancy 2D grid map is generated by discretizing the 3D point cloud of each detected object into a voxel grid and determining a top-down bird's eye view (BEV) projection of the voxel grid;
- aggregating, the dense occupancy 2D grid maps for a set of objects from the plurality of detected objects in each of the set of successive images which have same object graph representation to obtain a single dense occupancy 2D grid map corresponding to each of a set of unique object graph representations;
- determining an occupancy score for each of a plurality of regions defined on each dense occupancy grid map corresponding to each of the set of unique object graph representations, by summing a plurality of grid cell weights within each of the plurality of regions, wherein each of the grid cell weights are indicative of average weight of points in the grid cell;
- determining a normalized occupancy score distribution over each of the dense occupancy grid maps corresponding to each of the set of unique object graph representations by analyzing intensity of the plurality of grid cells on the grid map, wherein the normalized occupancy score distribution is used to find local maxima that approximately localizes one or more instances of each of the set of unique object graph representations; and
- determining a unique instance graph representation for the target object by stacking each of the dense occupancy grid maps corresponding to each of the set of unique object graph representations on top of the other, and then max-pooling along the stacked dimension.

15. The non-transitory computer readable mediums of claim 11, wherein the graph discriminator algorithm comprising:
- determining a set of discriminative instance graph representations by computing a pairwise set difference between the graph representation of at least one natural language instruction and each of the set of unique instance graph representations of the plurality of detected objects;
- classifying information comprised in the one or more natural language instructions for identifying the target object into one of (i) a confirm state based on a comparison of cardinality of the set of discriminative instance graph representations with a first predefined value, (ii) a mismatch state, (iii) an ambiguous state based on a comparison of cardinality of the set of discriminative instance graph representations with a second predefined value, and (iv) a missing state based on a comparison of cardinality of the set of unique instance graph representations with the first predefined value; and
- determining the ambiguity in identifying the target object based on the classified state.

\* \* \* \* \*